Jan. 4, 1966
H. R. VOIGT
3,227,123
HYDROFOIL SPEED AND PLEASURE CRAFT
Filed May 6, 1964
5 Sheets-Sheet 4
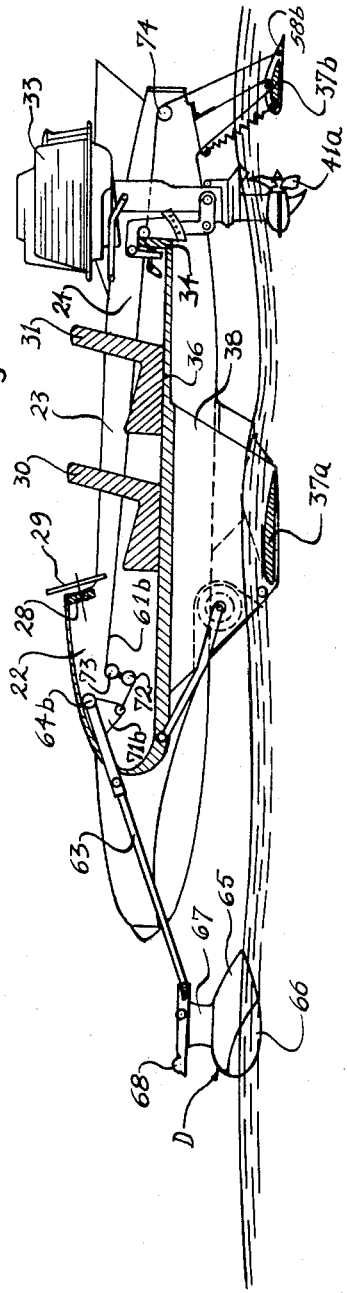
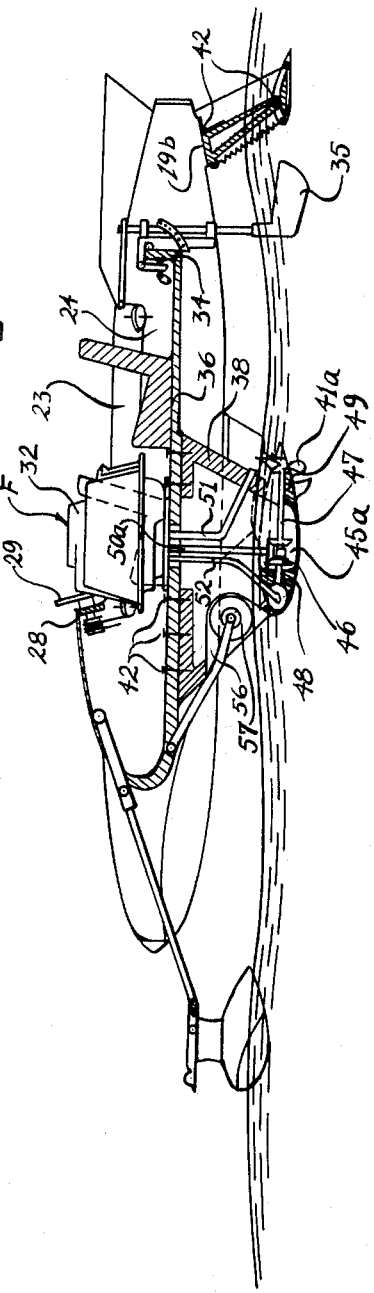
INVENTOR.
Hellmut R. Voigt Jan. 4, 1966          H. R. VOIGT          3,227,123
HYDROFOIL SPEED AND PLEASURE CRAFT
Filed May 6, 1964          5 Sheets-Sheet 5
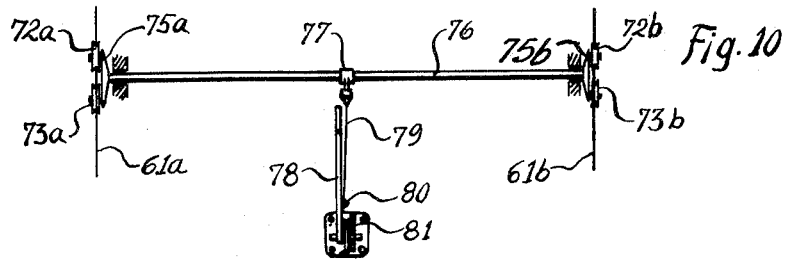
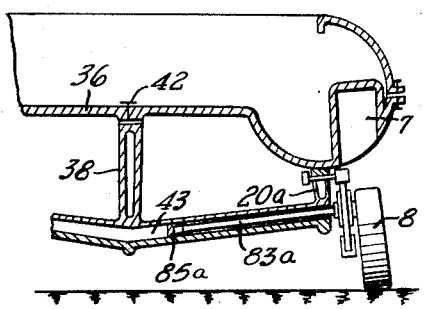
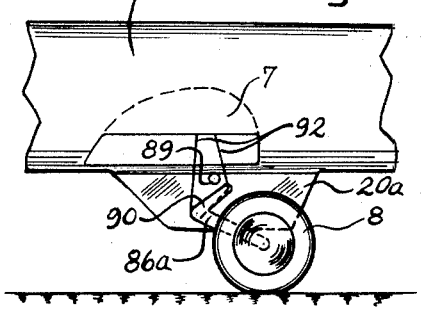
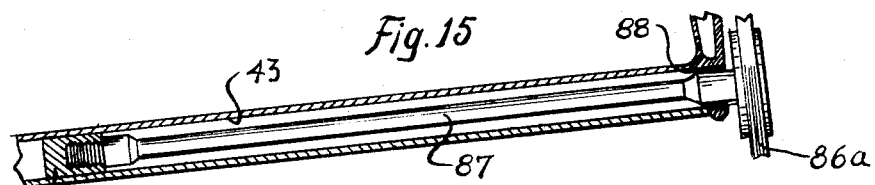
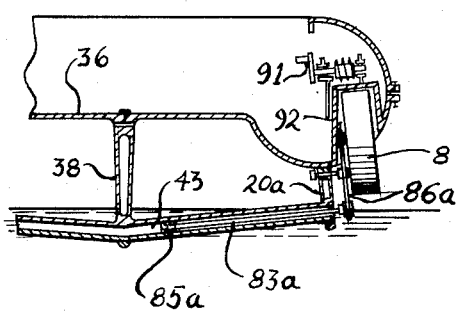
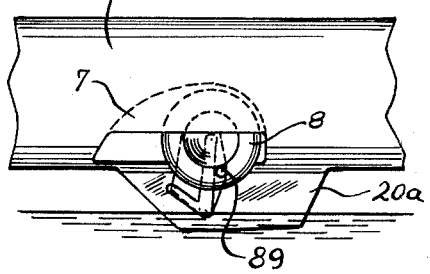
INVENTOR.
Hellmut R. Voigt United States Patent Office 3,227,123
Patented Jan. 4, 1966

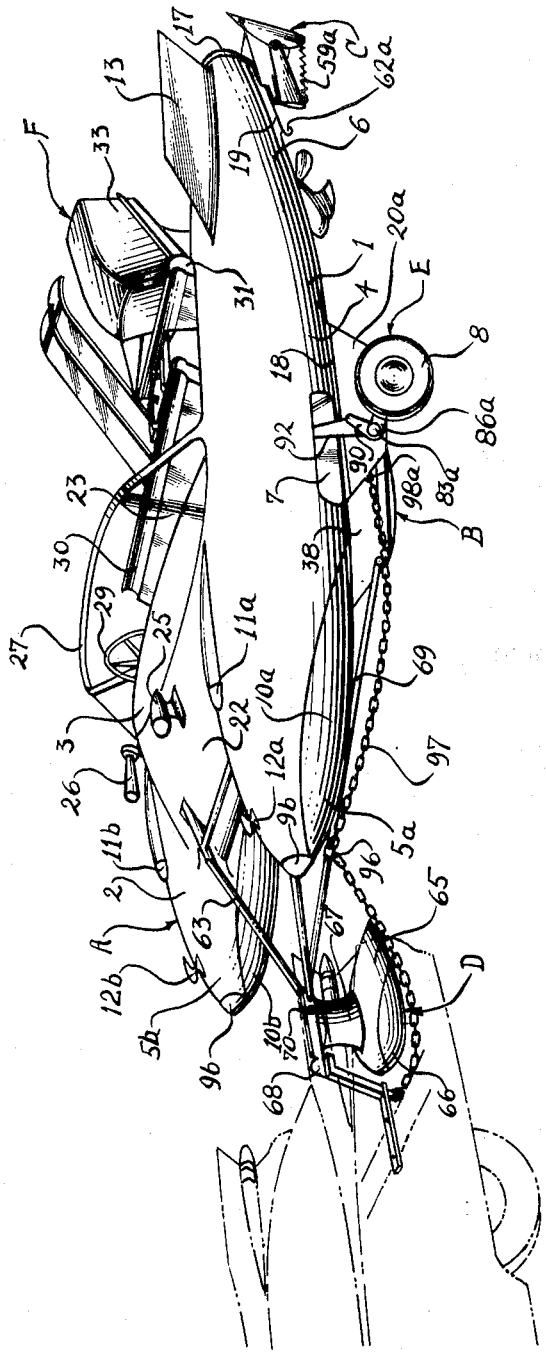

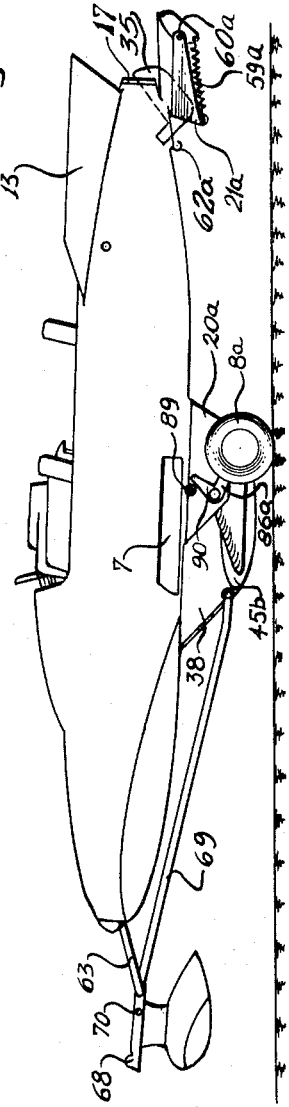
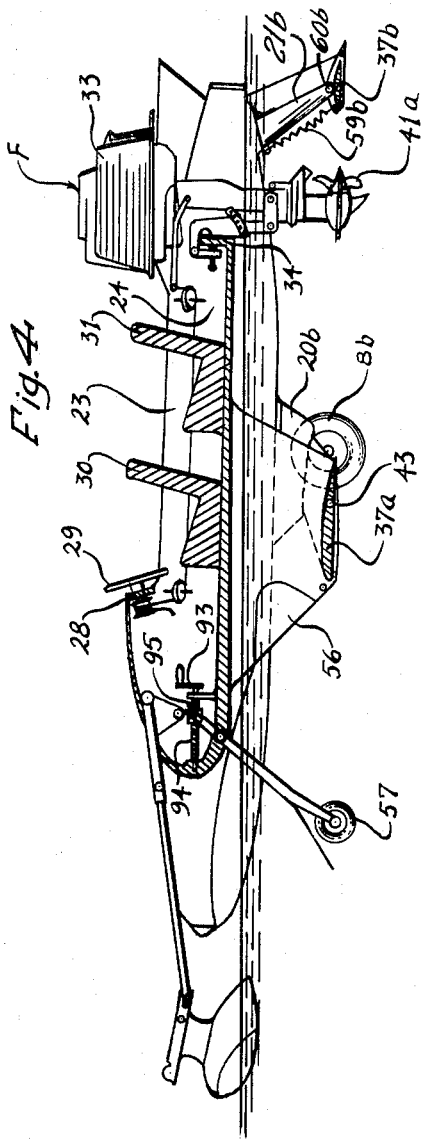

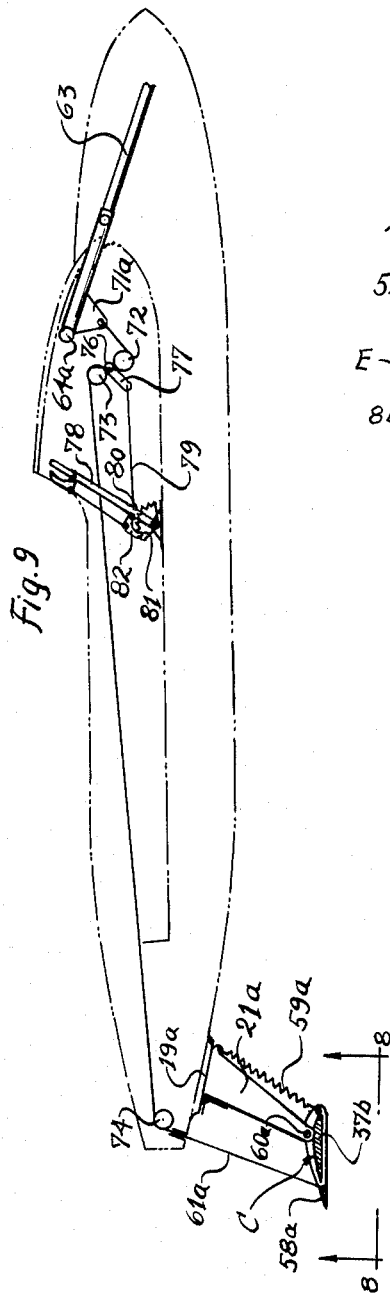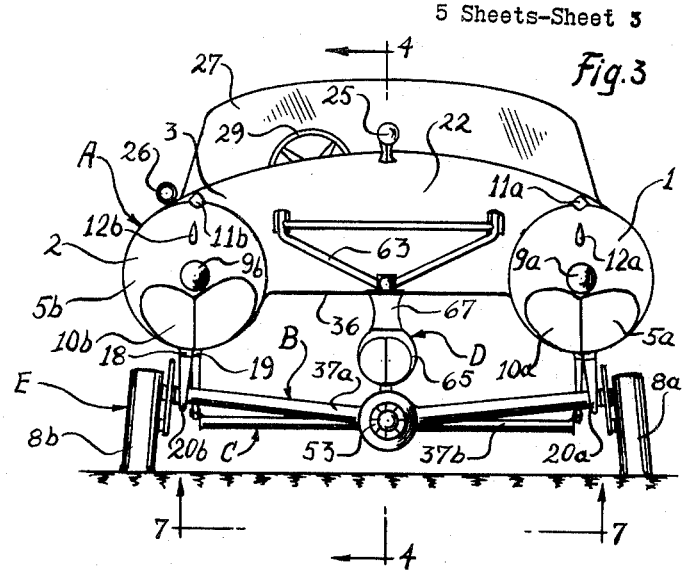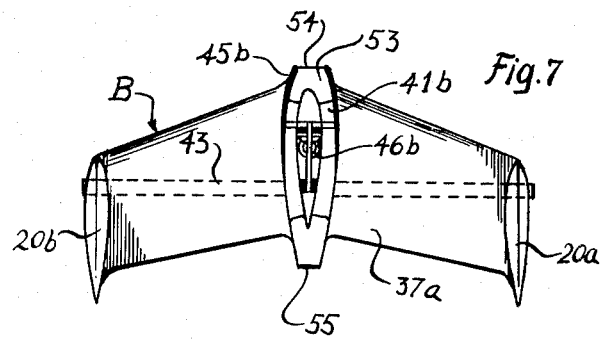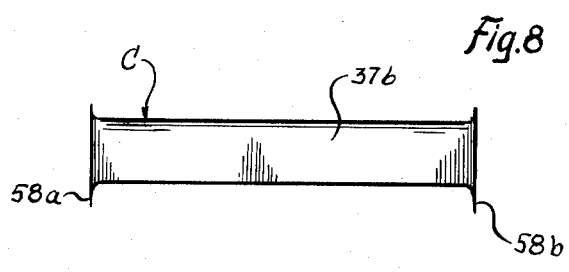

3,227,123
HYDROFOIL SPEED AND PLEASURE CRAFT
Hellmut R. Voigt, 11821 Redbank St., Sun Valley, Calif.
Filed May 6, 1964, Ser. No. 365,355
16 Claims. (Cl. 114—66.5)

This invention relates to hydrofoil crafts and is concerned with hydrofoil speed and pleasure boats and may also be adapted for use in connection with other types of water surface transportation, commercial as well as military.

It is a general object of this invention to provide a hydrofoil craft of the type in which the hull of the boat is provided with downwardly directed struts which carry hydrofoils on which, when speed is attained, the hull is supported clear above the surface of the water. This invention relates more particularly to hydrofoil crafts of the catamaran type hull and an airplane type longitudinal distribution of the hydrofoil area with a surface piercing dihedral main lifting plane or hydrofoil wing located near the center of gravity of the craft and a smaller totally submerged control plane or hydrofoil elevator located at the stern of the craft.

Since the present invention is particularly adapted for use as a speed and pleasure boat I will describe it in that connection, it being understood that the craft is equally useful for all types of water surface transportation for example as a military craft, a ferry boat, a racing boat or larger ships for commercial as well as military applications.

The usual craft of the type under consideration are characterized either by a totally submerged hydrofoil area, which is difficult to control in altitude level with respect to the water surface and extensive equipment like autopilots are required to automatically control the incidence of the boat, i.e. the angle of attack of the hydrofoils, but which is prohibitive for smaller crafts such as pleasure boats; or by all surface piercing hydrofoils rigidly connected to the hull, which are likewise unstable in altitude level especially in rough waters. In most cases the hull is of the single V-bottom or three point planing design as used by conventional displacement boats, but which is unsuitable for hydrofoil crafts. Other crafts show whole sets of hydrofoils arranged one above the other which are hydrodynamically inefficient and difficult to operate in shallow waters owing to their extensive draft. All of them are unsuitable for transportation over land either by a trailer or otherwise, which is essential for pleasure boats. Also hydrofoil kits have been suggested to be attached to conventional boat hulls. Both the hydrofoil kits and the hulls are unsuitable for each other and the assemblies are weak strengthwise and inefficient hydrodynamically. These and other inefficiencies of the state of the art did not allow the general utilization of the far superior hydrofoil principle for pleasure boating up to this time.

It is a general object of this invention to provide a simple, smoothly operating hydrofoil craft of high performance characteristics and which is reliable in operation on water as well as for transportation over land. Another general object of this invention is to provide an economical hydrofoil craft with low power requirements and low fuel consumption compared to conventional boats of equal speed and capacity.

A further general object of this invention is to provide a hydrofoil craft with high lift to drag ratio during both hull-borne and foil-borne operation. It is still another general object of this invention to provide a hydrofoil craft of streamlined and lightweight aircraft type design.

A still further general object of this invention is to provide a hydrofoil craft featuring an extreme high load to weight ratio.

An object of this invention is to provide a catamaran type hull design most suitable for hydrofoil crafts.

It is another object of this invention to provide a hydrofoil craft of the character referred to involving a main surface piercing dihedral hydrofoil wing located near the center of gravity of the craft which is rigidly connected to the hull and a smaller totally submerged hydrofoil elevator located at the stern of the craft, pivotally connected to the hull and which is adjustable in its angle of attack.

It is still another object of this invention to provide a hydrofoil craft with an elevator of the character referred to, which is automatically adjusted with respect to speed, load and water surface condition by means of a simple pure mechanically acting sensing device which follows the trend of the water surface in front of the craft and adjusts the angle of attack of the elevator accordingly.

A still further object of this invention is to override said automatic control by an additional manual operated control mechanism, so that the most suitable angle of attack of the elevator can be achieved with respect to speed, load and water surface condition and for all phases of operation i.e. acceleration, take-off and flying of the craft.

An object of this invention is to provide wing tip plates in form of end fins on the elevator and streamlined end struts on the wing to reduce the induced drag of the hydrofoils which increases the performance of the craft and stabilizes the craft about its yaw axis.

Another object of this invention is to provide a dihedral wing with incidence angles increasing from the center to the ends of the wing, which counteracts the rolling of the craft and increases the side stability.

A further object of the invention is to incorporate an undercarriage into the craft to eliminate the conventional trailer for road transportation.

A still further object of this invention is to provide a torsion bar spring system for the undercarriage.

Another object of this invention is to provide the propelling thrust for the craft by means of an outboard motor installation per se, the steering of the craft being accomplished by swiveling the motor propeller unit. Still another object of this invention is to install an inboard motor, the steering of the craft being accomplished by means of a rudder.

A further object of this invention is to provide a water jet propulsion system.

It is still further an object of this invention to provide for a tricycle undercarriage by adding a retractable nose wheel, which when lowered allows, under favorable conditions of the shore line, to beach the craft under its own power and which eases taxiing on the beach.

The various objects and features of my invention will be fully understood from the following detailed description of typical preferred forms of my invention, throughout which description reference is made to the accompanying drawings, in which:

FIG. 1 is a perspective view of a typical embodiment of the present invention showing the hydrofoil craft being towed by an automobile.

FIG. 2 is a side view of the hydrofoil craft prepared for road transportation.

FIG. 3 is a front view of the hydrofoil craft.

FIG. 4 is a sectional view taken substantially as indicated by line 4—4 on FIG. 3 and showing the hydrofoil craft in hull-borne, slow speed operation in water with tricycle undercarriage already extended for beaching.

FIG. 5 is a sectional view taken substantially as indicated by line 4—4 on FIG. 3 and showing the hydrofoil craft during foil-borne high speed operation with its undercarriage retracted and propelled by an outboard motor propeller unit.

FIG. 6 is a sectional view taken substantially as indicated by line 4—4 on FIG. 3 and showing the hydrofoil craft during foil-borne operation propelled by an inboard motor propeller unit and steered by a rudder.

FIG. 7 is a detailed sectional view taken as indicated by line 7—7 on FIG. 3 and showing the shape of the hydrofoil wing with a water jet propulsion system incorporated into the center body of the wing.

FIG. 8 is a view taken as indicated by line 8—8 on FIG. 9 and showing the outline of the hydrofoil elevator.

FIG. 9 is a detailed view of the manual control system for the hydrofoil elevator.

FIG. 10 is a detailed view showing a part of the manual control system.

FIGS. 11 and 12 show the retractable undercarriage incorporated into the hydrofoil craft in its extended position.

FIGS. 13 and 14 show the undercarriage in its retracted position.

FIG. 15 is an enlarged detailed sectional view of the torsion-bar spring system provided for the undercarriage.

The present invention has to do with hydrofoil craft and as illustrated throughout the drawings is shown applied to a hydrofoil speed and pleasure boat and involves generally a frame or hull A (FIGS. 1 and 3), a hydrofoil wing B (FIGS. 1, 3 and 7), a hydrofoil elevator C (FIGS. 1, 3 and 8), a sensing device D (FIGS. 1, 3 and 5), an undercarriage E (FIGS. 1, 3 and 11 to 14) and a propulsion system F (FIGS. 1, 4 and 6).

As shown in FIGS. 1 and 3 the frame A preferably resembles a catamaran type hull comprising two pontoons 1 and 2 and a cockpit 3. Both pontoons are preferably hollow cylindrical bodies of streamlined shape with a cylindrical middle section 4, a paraboloid front section 5a and 5b and a conoidal rear section 6. The middle section 4 forms a part of the cockpit and includes also a well 7 to receive the wheel 8 of the undercarriage E in its retracted position.

The front section 5 deviates from a true paraboloid in its lower part, which is shaped into a keel 10a and 10b having a surfboard effect which prevents bouncing of the craft in rough waters and high waves and keeps spray water away from the cockpit. On its top, the front section carries the necessary position lights 11a and 11b and cleats 12a and 12b and its tip is provided with protective rubber bumpers 9a and 9b. Both front sections 5a and 5b will receive electric batteries, fuel tanks, water tanks and the like to counterbalance the tail loads of the craft.

The rear section 6 carries on its top necessities like stern light, flag pole, antenna and cleats and is provided with a fin 13. In its blunt external end an automotive type tail light assembly 17 is inserted.

The pontoons 1 and 2 are built with a relative thin skin stiffened by bulkheads and stringers and in any suitable material such as metal, Fiberglas, plywood and others. From the bottom, near the center line, project streamlined bosses 18 and 19, where the struts 20a and 20b and 21a and 21b of the hydrofoils B and C are connected. Inside the pontoons is a level floor installed to facilitate storage. Diverse control cables and electric wires are run inboard of the pontoons.

The cockpit 3 forms the rectangular middle portion of the hull A. The pontoons 1 and 2 are either mechanically connected to or can be molded integrally with the cockpit 3. The front section 22 of the cockpit is streamlined and carries at its top a search light 25, a warning horn 26, a windshield 27 and ends in the dash board 28. The dash board 28 supports the steering wheel 29 and diverse switches and instruments. Inboard of the front section run electric wires and the controls for steering, power unit and elevator.

The middle section 23 of the cockpit accommodates the passengers and is equipped with seats 30 and 31, wherein the front seats are adjustable to shift weight either backward or forward to better balance the craft during its foil-borne operation. In case of an inboard installation 32 the middle section also provides for the power unit.

The rear section 24 of the cockpit, in case of an outboard installation (FIG. 5), provides for the power unit, which is clamped to the transom 34 or in case of an inboard installation 32 carries the rudder 35 (FIG. 6).

The rear section could be also developed into an automotive type trunk for storage.

The floor 36 of the cockpit lies approximately even with the center line of the pontoons and is intended to stay above the water surface under any condition. The cockpit can be built from any suitable material such as metal, Fiberglas, plywood and others.

The hydrofoil wing B comprises the foil 37a (FIG. 7), the end struts 20a and 20b and the central strut 38 (FIG. 2). The hydrofoil wing is located in respect to the hull A so that its lift center lies slightly in front of the center of gravity of the craft as being assumed under normal load distribution. The hydrofoil wing therefore supports the surmounting portion of the total weight of the craft while the elevator C carries and balances the rest of the weight. The profile of the foils 37a and 37b resembles an airfoil with a substantial flat under side and a convex upper side, a rounded leading edge and a sharp trailing edge which features a high lift to drag ratio and provides for a hydrodynamically highly efficient wing system.

The dihedral shape of the wing increases side stability and dampens rolling motion of the craft. The sweptback wing in conjunction with the backwardly slanting struts deflects floating objects and throws them off towards the sides. Debris cannot collect at its leading edges which would disturb the water flow and produce additional drag. This action also protects the propeller 41a and the elevator C against these floating matters and damages to foils and struts by impact loads are minimized. The intersections of the foils with the struts are chamfered for higher efficiency of the foils. Both the foils 37a and 37b and the struts 20, 21 and 38 (FIG. 6) are built as hollow bodies for lightness and buoyancy with reinforced leading and trailing edges and with reinforced portions on top and bottom to receive the fittings and fasteners 42 (FIG. 6) which connect them to the hull A and to withstand impact loads by accidentally hitting the ground. The struts are of streamlined profile and match the bosses 18 and 19 at their junction.

The foil of the wing incorporates a tubular metal spar 43 for extra stiffness and which also receives the axles 83a and 83b of the undercarriage E.

The foils 37a and 37b and the struts 20, 21 and 38 can be built from any suitable material such as metal, Fiberglas, plywood and others. The leading edges of foils and struts can be made also from flexible material like rubber to minimize damages as well as a precaution to prevent fatalities in overrunning unseen swimmers in the water. In case of an inboard installation 32 (FIG. 6), the lower end of the central strut 38 would be shaped into a streamlined housing 45a to receive the bevel gear drive 46, the propeller shaft 47 and the bearings 48 and 49 for the shaft. The vertical shaft 50a, the exhaust pipe 51 and the cooling water pipe 52 would be housed in the hollow central strut 38. In the case of a water jet propulsion system 53 (FIG. 3 and 7) said streamlined housing 45b has a faired water intake 54 in front, a water jet nozzle 55 in rear and supports the propeller 41b, which is driven by said vertical shaft and bevel gear drive 46b, said combination resembles a propeller pump and as a whole forms a water jet propulsion system.

When a tricycle undercarriage is provided a well 56 is incorporated into the front portion of the central strut 38 to receive the nose wheel 57 (FIG. 6) in its retracted position.

The hydrofoil elevator C (FIGS. 1, 8 and 9) comprises the foil 37b, end fins 58a and 58b, struts 21a and 21b and springs 59a and 59b. The hydrofoil elevator is located in the far rear of the craft to provide for the greatest possible distance between the wing B and the elevator C which increases the effectiveness of the elevator in controlling the incidence of the craft.

The elevator foil 37b (FIG. 8) is of straight rectangular shape with a span approximately equal to the distance between the center lines of the pontoons 1 and 2. Said foil 37b is pivotally connected to the struts 21a and 21b at the points 60a and 60b slightly in back of the lift center of the foil, giving said foil the tendency to go always into greater angles of attack. Said tendency is more positively secured by the springs 59a and 59b, the ends of which are connected to the front ends of the fins 58a and 58b and to the upper front ends of the struts 21a and 21b respectively. Said tendency is counteracted by the elevator cables 61a and 61b which are connected to the rear ends of the fins 58a and 58b and controlled by the sensing device D. The struts 21a and 21b are hinged to the bosses 19a and 19b and are held in operational position (FIGS. 4, 5 and 6) by arrester means 62a and 62b and can be tilted up (FIG. 2) to allow sufficient ground clearance for road transportation.

The sensing device D consists of an outrigger 63 which is pivotally anchored in the hull at points 64a and 64b and rigidly fastened at its free end to the streamlined shaft 67 of a swimmer 65. Said swimmer is a streamlined floatable body, the lower front end of which is formed into a keel 66 for the same purpose as applied to the pontoons 1 and 2.

Attached to the sensing device is also the hitch 68 for towing the craft by a motorized vehicle. For road transportation a tow bar 69 (FIGS. 1 and 2) connects the lower front end of the central strut 38 and the front end 70 of the outrigger 63 by means of ball-lock bolts, which converts the pivotally connected sensing device D into a rigid structure. Said outrigger can also be telescopically extended to increase the distance between said swimmer and said hydrofoil wing as may be desirable. At the pivot points 64a and 64b levers 71a and 71b (FIGS. 5 and 9) are rigidly connected to the outrigger arms and the elevator cables 61a and 61b are fastened to their free ends, which lead over guide rollers 72, 73 and 74 to the elevator fins 58a and 58b. The swimmer 65 therefore, by following the water surface, controls the angle of attack of the elevator C which in turn controls the incidence of the craft. In addition to said automatic control a manually operated mechanism is provided, comprising a shaft 76 (FIGS. 9 and 10), pivotally supported in the front section 22 of the cockpit and two rocker arms 75a and 75b rigidly connected to its ends and which support guide rollers 72a, 72b and 73a, 73b. At the center of said shaft a lever 77 is fastened and in line with said lever a stick 78 is pivotally supported on the floor of the cockpit. A cable 79 connects the end of the lever 77 and a point 80 of stick 78. In shifting said stick back and forth the guide rollers 72 and 73 are twisting the elevator cables 61. By the ratchet 81 and pawl 82 the stick 78 can be set and locked in any desired position. Said manual control overrides the automatic control system by adjusting the incidence of the craft according to water surface condition and the status of operation of the craft.

For road transportation as well as for launching and beaching of the craft an undercarriage E is provided which replaces the more commonly used trailer. The tubular spar 43 of the hydrofoil wing B is designed to receive the axles 83 of the independently suspended wheels 8a and 8b. To lock the wheels in place threads are provided at the inner ends of the axles 83 which engage into female threads of blocks 85a and 85b which are rigidly connected to the spar 43. There will be righthand threads on the righthand side and lefthand threads on the lefthand side of the craft, so that the wheels tighten to the frame rather than loosen during driving. A wrench will be provided as a tool to loosen or tighten said threads before removing or attaching the wheels, which normally takes place when the craft is floating.

This invention provides also for a retractable undercarriage, the wheels being retracted into wells 7 of the hull. In this case the axles of the wheels are off-set by the levers 86a. This arrangement can be easily converted into a torsion bar spring system to add to the flexibility of the undercarriage for a smooth ride on the road. In that case the axle ends received from the wing spar 43 are made thin and flexible enough to act as a torsion bar 87 (FIG. 15) and a sleeve bearing 88 is inserted at the ends of the spar 43, so that the torsion bar can easily twist. A rubber bumper 89 can be attached to the struts 20a and 20b, which serves in conjunction with the fingers 90 of the axles as a spring limit and at the same time as a stop (FIG. 14) for the retracted position of the wheels. The retraction or extension of the wheels can be accomplished in any conceivable way either hydraulically or mechanically by means of a crank 91 and a cable loop 92, which is connected to the free end of the fingers 90 and looped around the axles 83. The undercarriage E can be extended into a tricycle gear by adding a nose wheel 57 (FIG. 4). Said nose wheel is pivotally supported in the front section 22 of the cockpit and can be extended or retracted into the well 56 either hydraulically or mechanically by means of a crank 93 with spindle 94 and nut 95.

The power unit F can be a conventional outboard motor installation or an inboard motor installation working either with a propeller 41a or with a water jet propulsion system 53.

From the foregoing it will be apparent that I have provided an extremely practical hydrofoil craft and to my knowledge my invention represents the first speed and pleasure boat utilizing to the fullest extent the superior hydrofoil principle for recreational purposes. The craft described above and as shown in the accompanying drawings is easy, safe and economical to operate on water as well as to tow over land.

The hydrofoil craft as provided by this invention operates in the following manner.

To end boating, the propelling thrust must be reduced and the craft will gently settle down on its pontoons making the transition from foil-borne to hull-borne operation. Then the wheels are lowered mechanically or hydraulically. Provided with a tricycle undercarriage and under favorable condition of the shore line the craft can be beached under its own power and with no stepping into the water necessary for the passengers. Outside the water the tow bar 69 must be replaced and secured by the two ball-lock bolts chained to said tow bar and the hitch 68 of the outrigger 63 must be hooked over the ball attachment of the towing automobile. The safety chains 97 clamped to the tow bar at point 96 are to be attached with one end to the struts 20a and 20b at points 98a and 98b by means of snap hooks, the other ends being slipped through the eye incorporated into the automobile attachment and finally joined together by a snap lock which also secures the hitch from accidentally opening. The hydrofoil elevator C and the outboard power unit 33 or the rudder 35 respectively are tilted up to allow for more ground clearance. The nose wheel, if so provided, will be retracted. After plugging in the cable for the tail light assemblies 17a and 17b the craft is ready for transportation on the freeways.

To start out for a boating trip the craft will be pulled on its own undercarriage to the automobile, the hitch hooked over the ball attachment, the safety chains and the hitch secured by the snap lock, the tail light assemblies plugged in and the craft is ready to be towed to the water front. Arriving at the shore line, the tow bar with safety chains must be removed, the tail lights unplugged and the elevator and the outboard power unit or the rudder respectively must be lowered. The craft is then driven backward into the water. The operator retracts the undercarriage and starts the motor. During initial acceleration the elevator foil 37a is held in a neutral no lift position by working the manual elevator control stick 78, up to the speed required for take-off, i.e. for the transition from hull-borne to foil-borne operation. Then a slight negative angle of attack given to the elevator foil by working said stick, results in a more positive incidence of the craft which initiates the take-off. After the foil-borne position of the craft is perfected, the elevator foil must be brought back to a slight positive angle of attack to support its minor portion of the load. After the craft is foil-borne, the water drag is drastically reduced and high speed is gained with low horsepower. The ride is smooth and the visibility excellent.

Having described only typical preferred forms of my invention, I do not wish to be limited or restricted to the specific details herein set forth, but wish to reserve to myself any variations or modifications that may appear to those skilled in the art and fall within the scope of the following claims.

I claim:

1. A hydrofoil craft of the character described including a frame resembling a catamaran type hull of streamlined and lightweight aircraft type design with two pontoons and a cockpit, said cockpit comprising a floor, a front section, a middle section and a rear section located in between said pontoons; a hydrofoil wing comprising a foil, a central strut and two end struts; a hydrofoil elevator comprising a foil with two end fins and two struts hinged to said hull, with two arrester means to hold said elevator in operational position and with two springs connected to the tip of said end fins and to the top of its struts; a sensing device consisting of an outrigger pivotally anchored in said hull and a swimmer with a streamlined shaft rigidly fastened to the free end of said outrigger; a retractable undercarriage comprising two wheels turnably supported by bearings on their respective axles and a propulsion system; said hull, when speed is attained, is supported clear above the surface of the water by said hydrofoil wing and hydrofoil elevator; said foils providing an airplane type longitudinal distribution of the total hydrofoil area with the surface piercing dihedral main lifting plane or hydrofoil wing located near the center of gravity of the craft and said smaller totally submerged plane or hydrofoil elevator located at the stern of the craft; said hydrofoil wing being rigidly connected to the frame by its streamlined struts; said hydrofoil elevator's foil being pivotally connected to its streamlined struts and adjustable in its angle of attack; said angle of attack being controlled automatically by said sensing device located in front of the craft and which follows the contour of the water surface, this motion being transmitted by mechanical means, for instance elevator cables, to the hydrofoil elevator, said automatic control of the hydrofoil elevator's angle of attack being overridable by a manually operated control mechanism; a retractable undercarriage incorporated into the craft for its transportation over land with axles of the wheels being received by a tubular spar of said hydrofoil wing; the craft being propelled by any conceivable propulsion system.

2. A hydrofoil craft as described in claim 1 wherein said pontoons are hollow cylindrical bodies of streamlined shape with a cylindrical middle section, a paraboloid front section and a conoidal rear section; said middle sections form a part of the cockpit and include a well to receive said wheels of the undercarriage in their retracted position; said front sections deviating from a paraboloid in their lower parts are shaped into keels and carry on their outside position lights, cleats and rubber bumpers at their tips; said rear sections carry at their blunt external ends automotive type tail light assemblies and may also be provided with fins and from the bottom of said pontoons near their center line project streamlined bosses to which the struts of the hydrofoil wing and the hydrofoil elevator are connected; said pontoons are connected with said cockpit, which forms the middle portion of the frame; the front section of said cockpit is streamlined and carries outside a search light, a warning horn, and a windshield and houses controls for the steering, the hydrofoil elevator and a nose wheel and ends into a dashboard which supports a steering wheel; the middle section of said cockpit accommodates passengers and is equipped with front and back seats, said front seats being adjustable horizontally; said middle section can provide also for an inboard motor installation; the rear section of said cockpit provides a transom to clamp on an outboard motor respectively a rudder and can also be developed into an automotive type trunk for storage, said floor of the cockpit lying approximately even with the center line of the pontoons.

3. A hydrofoil craft as described in claim 1, wherein the profile of said foil resembles an airfoil with a substantially flat underside and a convex upper side, a rounded leading edge and a sharp trailing edge with an outline of said wing shaped preferably into a double trapezohedral foil with an emphasized dihedral and sweptback angularity and with intersections from foil to struts being chamfered; said struts are backwardly slanting and of streamlined profile; both the foil and the struts are built as hollow bodies with reinforced leading and trailing edges and reinforced top and bottom portions; said foil incorporates a tubular spar to receive said axles of the wheels of the undercarriage; the leading edges of said foil and struts can also be made from flexible material.

4. A hydrofoil craft as described in claim 1 including a foil intersecting with two end fins in a chamfered joint, wherein the outline of said foil is preferably of rectangular shape; said struts are backwardly slanting and of streamlined profile, said struts allowing the hydrofoil elevator to be tilted up to increase the ground clearance for road transportation but being held in operational position by said arrester means; said connection of the foil to its struts is slightly back of the lift center of the foil, giving the foil the tendency to go always into greater angles of attack, said tendency being more positively secured by said springs connected to the tip of said fins but counteracted by said elevator cables connected to the rear ends of the fins and said cables controlled by the sensing device adjust the angle of attack of the elevator foil and in turn the incidence of the craft according to water surface condition and the status of operation of the craft.

5. A hydrofoil craft as described in claim 1, wherein said swimmer resembles a streamlined floatable body with its lower front end formed into a keel, said swimmer in following the water surface swings the outrigger up and down and two levers fastened to the outrigger at its pivot points and with its free ends pointing downwardly swing likewise fore and back and said elevator cables attached to the free ends of said levers and leading to the elevator fins for instance over guide rollers supported in said pontoons adjust the angle of attack of the hydrofoil elevator according to the water level in respect to the craft and as a result the incidence of the craft is controlled by said swimmer.

6. A hydrofoil craft as described in claim 1, wherein said manually operated control mechanism for the hydrofoil elevator includes a shaft pivotally supported in the front section of said cockpit, two rocker arms rigidly connected to its ends and a pair of guide rollers supported by each rocker arm, said elevator cables loop around and in between these guide rollers in a S-shaped fashion, a lever fastened at the center of said shaft, a stick pivotally supported on the floor of the cockpit and in line with said lever, a cable connecting the lever with the stick so that by shifting the stick back or forth the guide rollers are twisting the elevator cables which in turn changes the angle of attack of the hydrofoil elevator and overrides said automatic control of the sensing device; said stick can be set and locked in any desired position by any conceivable means, for instance by a ratchet and pawl.

7. A hydrofoil craft as described in claim 1 including an undercarriage comprising two wheels turnably supported by bearings on their respective axles, wherein said axles are slipped into said tubular spar incorporated into the foil of the hydrofoil wing and threads provided at the inner ends of said axles engaging into female threads of blocks, which are rigidly connected inside said spar at proper locations, said threads allowing to remove or attach the wheels as desired, which normally takes place when the craft is floating.

8. A hydrofoil craft as described in claim 1 including a retractable undercarriage comprising two wheels turnably supported by bearings on their respective axles, wherein the wheels of said undercarriage are retractable into wells which are formed into the pontoons of said frame, the axles of said wheels having the form of a crank with a marked offset outside and adjacent to the tubular spar of the wing, the wheels being swung about the center of said spar forward and upward into said wells, said wheels can be retracted and extended in any conceivable way for instance mechanically by means of a reel and a cable loop, the loop ends being connected to a finger provided at the axles in the plane of the offset and said cable loop surrounding the axle is spooled tautly on the reel.

9. A hydrofoil craft as described in claim 1 including a retractable undercarriage comprising two wheels turnably supported by bearings on their respective axles, wherein said undercarriage is provided with a torsion bar spring system, the axles of said wheels having the form of a crank with a marked offset outside and adjacent to the tubular spar of the hydrofoil wing, one arm of each of said offset axles are slipped into said tubular spar and threads are provided at the ends of said arms engaging into female threads of blocks, which are rigidly connected inside said spar at the proper locations, the other arm of each of said offset axles turnably supporting a wheel of said undercarriage, said arms of the offset axles received by the wing spar are made thin and flexible enough to act as torsion bars and sleeve bearings are inserted at the ends of said spar so that the torsion bars can easily twist, limited by a rubber bumper attached to the end struts of the hydrofoil wing in conjunction with a finger provided at the axles in the plane of their offsets and in conjunction with said offset said rubber bumper serves also as a stop for the retracted position of the wheels.

10. A hydrofoil craft as described in claim 1 including a retractable undercarriage, wherein said undercarriage is extended into a tricycle gear by adding a nose wheel which is pivotally supported under the front section of said cockpit and retractable into a well incorporated into the central strut of said hydrofoil wing, the extension and retraction of the nose wheel being accomplished in any conceivable way, for instance mechanically by means of a crank with spindle and nut.

11. A hydrofoil craft as described in claim 1 including a propulsion system wherein thrust for propelling the craft is provided by a conventional outboard motor propeller unit, said motor being clamped to a transom incorporated in the rear section of said cockpit and steering of the craft is accomplished by swiveling said motor propeller unit in employing a conventional steering wheel installation.

12. A hydrofoil craft as described in claim 1 including a propulsion system wherein thrust is provided by an inboard motor propeller unit with its vertical shaft and its exhaust and cooling water pipes being housed in the hollow central strut of the hydrofoil wind and its bevel gear drive, its propeller shaft and propeller being supported in a streamlined housing formed by the lower portion of said central strut and steering of the craft is accomplished by a rudder and a conventional steering wheel installation.

13. A hydrofoil craft as described in claim 12 including a propulsion system wherein thrust is provided by a water jet propulsion system, said streamlined housing of the central strut featuring a faired water intake in front and a water jet nozzle in rear and supporting inside said bevel gear drive and a propeller pump, said propeller pump being driven by said inboard motor by means of said vertical shaft and said bevel gear drive.

14. A hydrofoil craft as described in claim 10 wherein for road transportation of the craft by means of an automobile the retractable undercarriage is lowered and said nose wheel is brought into its retracted position, said hydrofoil elevator being secured in its tilted up position and a trailer hitch assembly is provided comprising a trailer hitch ball socket, permanently attached to the front end of said outrigger of said sensing device, and a trailer hitch ball permanently attached to the rear end of said automobile, said ball socket being hooked over said ball of said automobile and a tow bar is provided which connects the central strut of the hydrofoil wing at its lower front end to the front end of said outrigger of said sensing device and two safety chains being attached to said tow bar, the rear ends of said safety chains being hooked to said end struts of the hydrofoil wing and the front ends of said safety chains being joined together with said hitch ball socket by any conceivable means for instance a snap lock, which also secures said hitch from accidentally opening.

15. A hydrofoil craft as described in claim 14, wherein for road transportation of the craft by means of an automobile an outboard motor propeller unit is secured in its tilted up position.

16. A hydrofoil craft as described in claim 14, wherein for road transportation of the craft by means of an automobile a rudder is secured in its tilted up position.

References Cited by the Examiner

UNITED STATES PATENTS

| | | | |
|---|---|---|---|
| 2,073,864 | 3/1937 | Brush | 114—66.5 |
| 2,584,347 | 2/1952 | Hazard | 114—66.5 |
| 2,681,029 | 6/1954 | Canazzi | 115—35 |
| 2,703,063 | 3/1955 | Gilruth | 114—66.5 |
| 2,707,084 | 4/1955 | Mills | 114—66.5 |
| 2,708,894 | 5/1955 | Hook | 114—66.5 |
| 2,795,202 | 6/1957 | Hook | 114—66.5 |
| 3,052,202 | 9/1962 | Dearborn | 9—1 |
| 3,055,331 | 9/1962 | Singelmann | 114—66.5 |
| 3,133,293 | 5/1964 | Brush | 9—1 |

FOREIGN PATENTS 863,288  1/1941  France.

MILTON BUCHLER, *Primary Examiner.*

FERGUS S. MIDDLETON, *Examiner.*

D. P. NOON, A. H. FARRELL, *Assistant Examiners.*